US006304955B1

(12) United States Patent
Arora (10) Patent No.: US 6,304,955 B1
(45) Date of Patent: Oct. 16, 2001

(54) METHOD AND APPARATUS FOR PERFORMING LATENCY BASED HAZARD DETECTION

(75) Inventor: Judge K. Arora, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/223,241

(22) Filed: Dec. 30, 1998

(51) Int. Cl.[7] ....................................................... G06F 9/38
(52) U.S. Cl. ............................ 712/217; 712/216; 712/213
(58) Field of Search ..................................... 712/216, 217, 712/213

(56) References Cited

U.S. PATENT DOCUMENTS

| | | | |
|---|---|---|---|
| 4,287,561 | * 9/1981 | Liptay | 712/217 |
| 5,828,895 | * 10/1998 | Chan et al. | 712/23 |
| 5,835,747 | * 11/1998 | Trull | 712/216 |
| 5,933,618 | * 8/1999 | Tran et al. | 712/217 |
| 5,966,544 | * 10/1999 | Sager | 712/32 |
| 6,035,389 | * 3/2000 | Grochewski et al. | 712/216 |
| 6,101,596 | * 8/2000 | Tanaka et al. | 712/216 |
| 6,178,492 | * 1/2001 | Matsuo | 712/23 |
| 6,216,234 | * 4/2001 | Sager et al. | 713/501 |
| 6,219,781 | * 4/2001 | Arora | 712/217 |

* cited by examiner

Primary Examiner—William M. Treat
(74) Attorney, Agent, or Firm—David J. Kaplan (57) ABSTRACT

Performing hazard detection in a processor that exhibits register latencies between execution units. The opcode classes of producer and consumer instructions are determined. Using these opcode classes, the register latency between the producer and consumer instructions is determined, and a register status signal is sent.

28 Claims, 4 Drawing Sheets

METHOD AND APPARATUS FOR PERFORMING LATENCY BASED HAZARD DETECTION

The present invention relates to computer systems and more particularly to detecting hazards in the execution of instructions that use execution units which may experience different register latencies.

BACKGROUND

Computer systems, from small handheld electronic devices to medium-sized mobile and desktop systems to large servers and workstations, are becoming increasingly pervasive in our society. Computer systems typically include one or more processors. A processor manipulates and controls the flow of data in a computer by executing instructions. Increasing the speed at which instructions are executed tends to increase the computational power of the computer. Processor designers employ many different techniques to increase processor speed to create more powerful computers for consumers. One such technique is to implement a pipeline in a processor.

A pipeline is an assembly line for instructions. When an instruction is issued to a processor pipeline, the instruction is progressively processed through separate stages in the pipeline. At any given moment, the pipeline may contain many instructions, each at different stages of processing at different stages in the pipeline. In this manner, processor resources are better utilized, thereby increasing instruction execution throughput by the processor.

The execution of one instruction in a pipeline may depend on the execution of one or more previously issued instructions. If data from a first instruction in a pipeline is needed by a second instruction in the pipeline, then the unavailability of the data from the first instruction causes a delay in the execution of the second instruction. In such a case, a portion of the pipeline may need special processing, such as being halted, or stalled, until the first instruction completes execution so the resulting data can be used by the second instruction. This condition is called a hazard.

For example, consider the following set of instructions:

load X→R1
add R1+R2→R3

Proper execution of the add instruction depends on proper execution of the load instruction because the add instruction requires the data in register R1 as an operand, and the load instruction must first load this data into R1. Unfortunately, the result of the load instruction may not be ready by the time the add instruction is ready to use it. Consequently, execution of the add instruction must be delayed until the load instruction is completed. This is known as a read after write (RAW) hazard because the add instruction must read register R1 after the load instruction writes to register R1.

Now consider the following set of instructions:

load X→R1
add R2+R3→R1

Proper execution of the add instruction no longer depends on the load instruction because the target of the load instruction, R1, is not an operand of the add instruction. R1 is, however, the target of the add instruction, and subsequent instructions that read from register R1 expect R1 to contain the sum of R2+R3 rather than the data loaded by the load instruction. Unfortunately, the load instruction may take longer to execute than the add instruction. Consequently, execution of the add instruction may need to be delayed until the load instruction is completed so that the load instruction does not overwrite its return data in place of R2+R3 in register R1. This is known as a write after write (WAW) hazard because the add instruction must write to register R1 after the load instruction writes to R1.

SUMMARY OF THE INVENTION

In accordance with one embodiment of the present invention, the opcode classes of producer and consumer instructions are determined. Using these opcode classes, the register latency between the producer and consumer instructions is determined, and a register status signal is sent based on the register latency.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

Figure 1A:
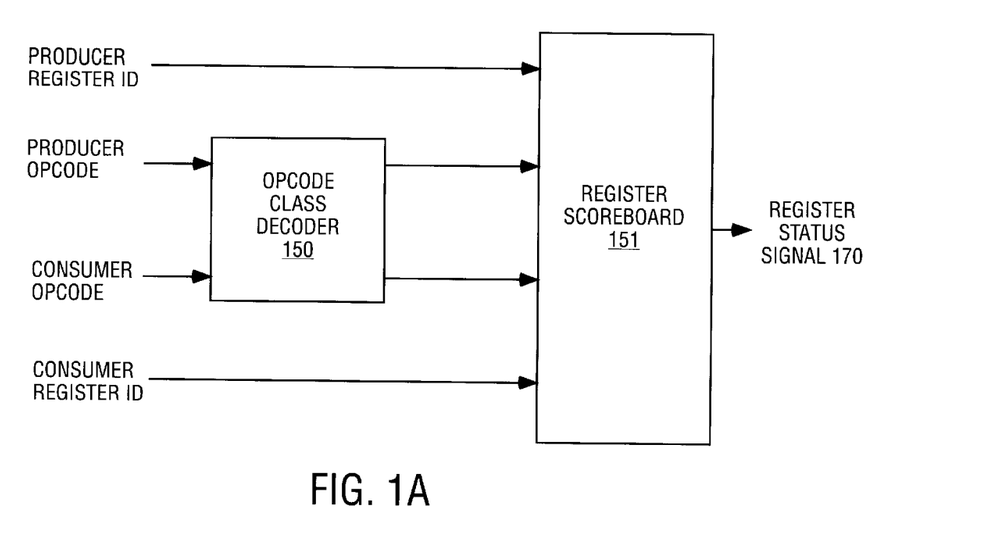
FIG. 1A is a circuit formed in accordance with an embodiment of the present invention.

FIG. 1A is a hazard detection circuit for a processor formed in accordance with an embodiment of the present invention. The circuit includes an opcode (operation code) class decoder 150 and a register scoreboard 151. Producer and consumer register IDs are provided to inputs of register scoreboard 151, and producer and consumer opcodes are provided to inputs of opcode class decoder 150. The output of opcode class decoder 150 provides opcode classes of both the producer and consumer opcodes to inputs of register scoreboard 151. The output of register scoreboard 151 is register status signal 170.

In accordance with one embodiment of the present invention, the opcode of a producer instruction is translated into an opcode class (defined below) by decoder 150, and this opcode class, along with a register ID of the producer instruction, is provided to register scoreboard 151 of FIG. 1A. Upon receiving this information, register scoreboard 151 determines the register status as being either pending (i.e. not ready) or ready (i.e. not pending) for various classes of consumer instructions.

The register value is subsequently consumed by the execution of a consumer instruction. This consumer instruction may be executed in an execution unit close to where the register is produced, or it may be executed in a more distant execution unit. If the register is consumed near to where the register is produced, then the register value may be immediately ready for consumption after its value is produced. If the register value is consumed far from where the register is produced, then the register value may take some time to travel to the distant execution unit before being ready for consumption. In addition, different execution units may take different amounts of time to execute an instruction. Consequently, register status signal 170, determined by register scoreboard 151 of FIG. 1A, is dependent on where the register value is consumed upon execution of the consumer instruction. The execution location (e.g. unit or cluster) is referred to as the class (or opcode class) of an instruction. This class may be decoded from the opcode of the instruction or from other microarchitectural details such as the execution cluster to which the instruction is routed.

The opcode of the consumer instruction is translated into an opcode class by decoder 150 of FIG. 1A, and this opcode class, along with the register ID of the consumer instruction, is provided to register scoreboard 151. Upon receiving this information, register scoreboard 151 determines the register status as being either pending or ready for the specific class of the consumer instruction, and generates register status signal 170. This register status signal may be used to generate a hazard/no hazard signal to, for example, stall at least a portion of a processor pipeline if the register status is determined to be pending.

A more detailed description of embodiments of the present invention, including various configurations and implementations, is provided below. As used herein, data contained in a register may be referred to as a register value or, simply, as a register. In the description provided below, the nomenclature and operation of the hazard detection circuit is explained in reference to the following set of instructions executed by a processor in accordance with one embodiment of the present invention:

load X→R0
add R1+R2→R3
subtract R3−R4→R5
packed add R5+R6→R7
store R7→Y

The subtract instruction produces register R5. The status of register R5 becomes "pending" when the subtract instruction begins execution. The status of R5 becomes "ready" when the register value becomes available to subsequent consumers of register R5. For example, the status of register R5 changes from pending to ready when the value of register R5 becomes available for use by the packed add instruction. For one embodiment of the present invention, the status of a register becomes ready when the value of the register will be available to an executing consumer instruction by the time the consumer instruction needs the value.

In general, an instruction that reads a register is a consumer of that register. An instruction that writes to a register is a consumer of that register with respect to previous instructions and a producer of that register with respect to subsequent instructions. For example, the subtract instruction writes to register R5 the value read from register R3 minus the value read from register R4. The subtract instruction is, therefore, a consumer of registers R3, R4, and R5 with respect to the load and add instructions, and a producer of register R5 with respect to the packed add and store instructions.

In accordance with one embodiment of the present invention, the load and store instructions are executed in a memory unit (M-unit) of the processor. Accordingly, the class of the load and store instructions is M. The add and subtract instructions are executed in an integer unit (I-unit) of the processor. Accordingly, the class of the add and subtract instructions is I. The packed add instruction is a single instruction multiple data (SIMD) instruction that is executed in a SIMD unit (S-unit) of the processor. Accordingly, the class of the packed add instruction is S.

For an alternate embodiment of the present invention, any number of instructions may be defined into these or alternate classes. For example, the add and subtract instructions may be defined in separate classes. Alternatively, additional classes may be defined to accommodate, for example, floating point operations executed in a floating point unit and logical operations executed in an arithmetic logic unit.

The add and subtract instructions are executed sequentially within the I-unit of a processor that implements register bypass delivery logic. Because these instructions are executed in the same unit, the distance that the value of register R3 must travel between production by the add instruction and consumption by the subtract instruction is relatively short. As a result, the value of register R3 is available for consumption by the subtract instruction by the time the subtract instruction needs to read the value, without the need to stall the subtract instruction. Therefore, the status of register R3, as seen by the subtract instruction, is ready, and there is no RAW hazard on register R3 between the add and subtract instructions.

In contrast, the subtract and packed add instructions are executed in two different units. Because these instructions are executed in two different units, the distance register R5 must travel between production by the subtract instruction and consumption by the packed add instruction is relatively long. As a result, the value of register R5 may not be ready for consumption by the packed add instruction by the time the packed add instruction would normally (i.e. without stalling) read the value. Therefore, the status of register R5, as seen by the packed add instruction, is pending, and there is a RAW hazard on register R5 between the subtract and packed add instructions. To resolve this hazard, the packed add instruction is stalled in the processor pipeline until the value of register R5 arrives from the I-unit at the S-unit for consumption by the packed add instruction. The length of time it takes for a register to be produced by a producer instruction and to be made ready for consumption by a consumer instruction is called the register latency period between the producer instruction and the consumer instruction.

Similarly, the packed add and store instructions are executed in two different units, and the distance register R7 must travel between production by the packed add instruction and consumption by the store instruction is relatively long. As a result, the value of register R7 may not be ready for consumption by the store instruction by the time the store instruction would normally read the value. Therefore, the status of register R7, as seen by the store instruction, is pending, and there is a RAW hazard on register R7 between the packed add and store instructions. To resolve this hazard, the store instruction is stalled in the processor pipeline for the register latency period.

Note that if the store instruction is replaced with a packed add instruction that consumes register R7, the status of register R7, as seen by the packed add instruction, is ready. In general, in accordance with one embodiment of the present invention, register status and register latency may be dependent on both the opcode class of the producer instruction and the opcode class of the consumer instruction. Therefore, the same register may have a status of ready for one consumer instruction for which the register latency period has expired, and a status of pending for another consumer instruction for which the register latency period has not expired.

In accordance with one embodiment of the present invention, the register latency period is measured in clock cycles, and the register latencies are predetermined for the processor architecture. For example, for a producer instruction having a producer opcode class of I, the register latency to a consumer instruction having a consumer opcode class of I is one clock; the register latency for a consumer opcode class of S is three clocks; and the register latency for a consumer opcode class of M is two clocks. In accordance with this embodiment, for a producer instruction having a producer opcode class of S, the register latency for a consumer opcode class of I is three clocks; the register latency for a consumer opcode class of S is one clock; and the register latency for a consumer opcode class of M is three clocks. Still in accordance with this embodiment, for a producer instruction having a producer opcode class of M, the register latency for a consumer opcode class of I is two clocks; the register latency for a consumer opcode class of S is three clocks; and the register latency for a consumer opcode class of M is one clock. For alternate embodiments of the present invention, alternate register latency periods are predetermined between producer and consumer instructions of various opcode classes.

Figure 1B:
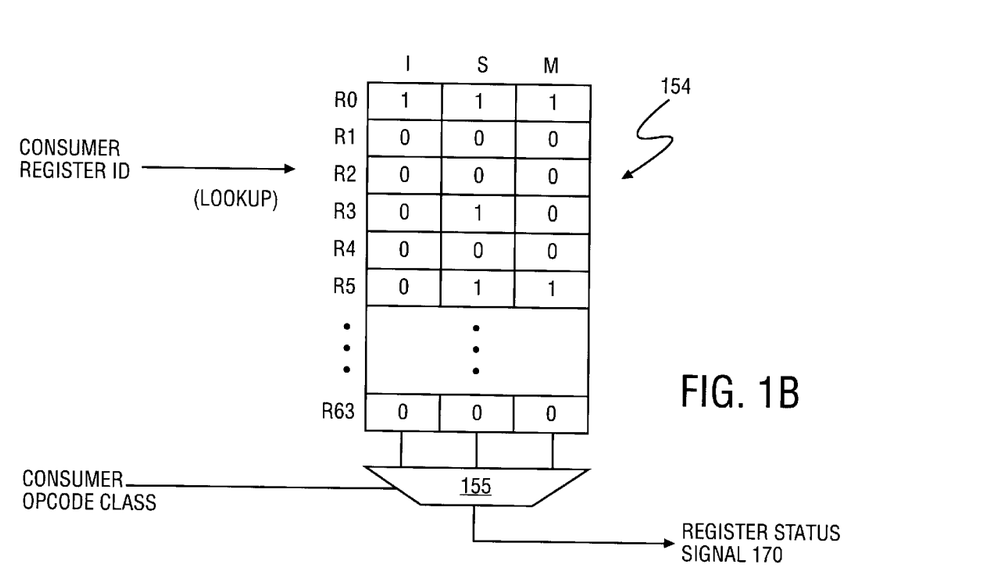
FIG. 1B is one embodiment of a portion of the circuit of FIG. 1A.
Figure 1C:
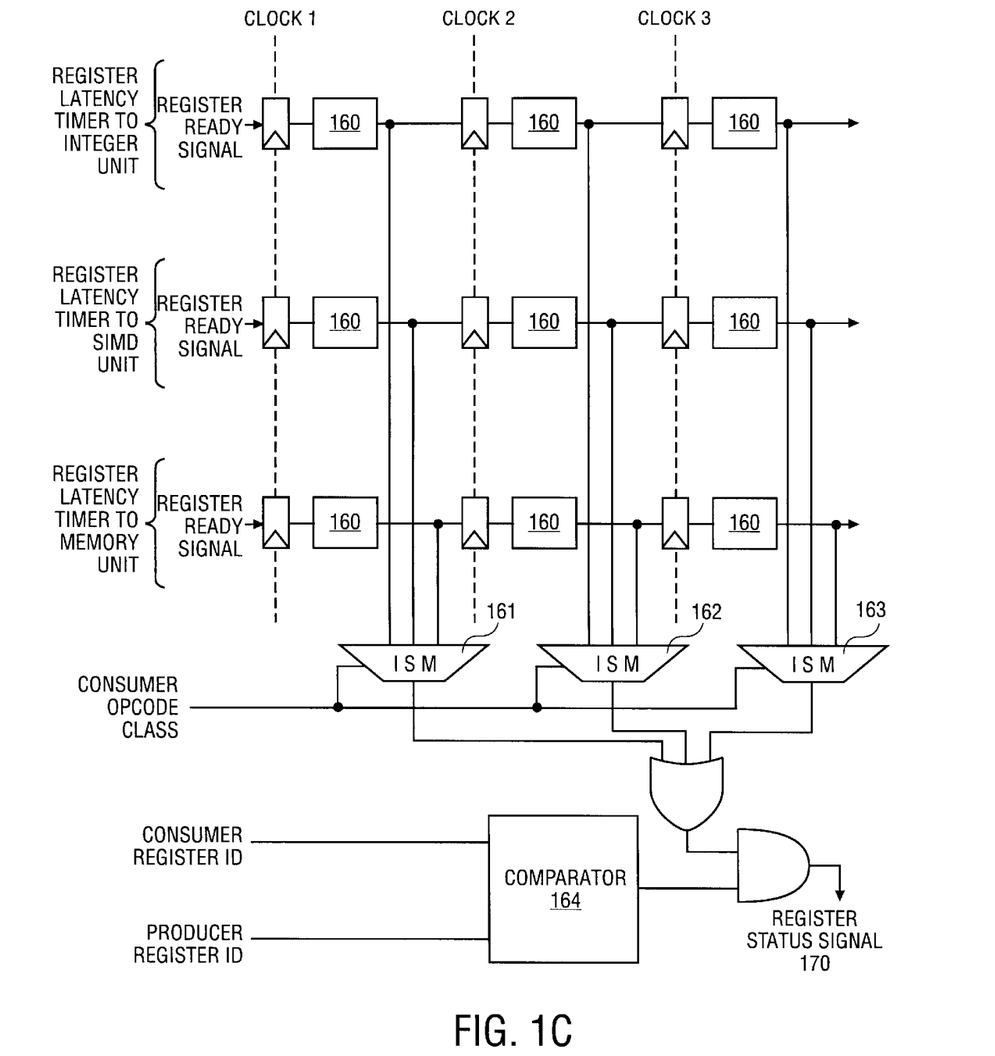
FIG. 1C is another embodiment of a portion of the circuit of FIG. 1A.

FIGS. 1B and 1C show two embodiments for register scoreboard 151 of FIG. 1A that implement the above-defined register latencies. FIG. 1B is an embodiment in which register scoreboard 151 is implemented as a register status table. FIG. 1C is an embodiment in which the scoreboard is implemented as a plurality of register latency timers comprising a series of clocked stages. For one embodiment of the present invention, register scoreboard 151 comprises the structures of both FIGS. 1B and 1C. For this embodiment, FIG. 1C may be used to generate register status signals associated with speculative instructions (instructions which are not yet retired), and FIG. 1B may be used to generate register status signals associated with non-speculative (retired) instructions. For this embodiment, a multiplexer may be used to select register status signal 170 of the embodiment of FIG. 1C as the output of register scoreboard 151 when a consumer register ID matches a producer register ID in comparator 164 of FIG. 1C. The mutliplexer otherwise selects register status signal 170 of the embodiment of FIG. 1B as the output of register scoreboard 151. The structure and operation of the circuits of FIG. 1B and 1C are described in more detail below.

In accordance with one embodiment of the present invention, register status is represented in the circuits of FIGS. 1A, 1B, and 1C as status bit values. For example, for one embodiment, a register having a status bit of "1" indicates that the register is pending, and a status bit of "0" indicates that the register is ready. For an alternate embodiment of the present invention, the status information may be represented by alternately defined bits.

The circuit of FIG. 1B is contained within register scoreboard 151 of FIG. 1A in accordance with one embodiment of the present invention. Table 154 is indexed by the register IDs of registers R0–R63. Table 154 comprises three columns of status bits, each column being associated with a consumer opcode class. For an alternate embodiment of the present invention, the table may be indexed by any number of register IDs and may comprise from two to as many columns of status bits as there are consumer opcode classes. The opcode class of the producer instruction and the number of clocks that have elapsed since the producer instruction was executed determine the status bit values. Therefore, each status bit of the table represents the output of an associated register latency timer.

For example, consider a producer instruction having an opcode class of I and producing register R(n). The register latency between a producer instruction of class I and a consumer instruction of class I is one clock. Therefore, for the duration of this one clock, the status bit associated with the register ID for R(n) in table 154 of FIG. 1B indicates a status of pending in column 1, and the status bit indicates a status of ready during subsequent clocks. The register latency between a producer instruction of class I and a consumer instruction of class S is three clocks. Therefore, for the duration of these three clocks, the status bit associated with the register ID for R(n) in table 154 indicates a status of pending in column S, and the status bit indicates a status of ready during subsequent clocks. The register latency between a producer instruction of class I and a consumer instruction of class M is two clocks. Therefore, for the duration of these two clocks, the status bit associated with the register ID for R(n) in table 154 indicates a status of pending in column M, and the status bit indicates a status of ready during subsequent clocks.

Table 154 of FIG. 1B shows the status bits contained in the table once the packed add instruction begins execution (one clock after the subtract instruction completes execution). As can be seen, the load instruction has left all three classes of status bits for register R0 indicating that register R0 is pending. The load instruction may take many clocks to complete execution because data X may be located in a relatively high latency cache. As a result, subsequent instructions that consume register R0 are stalled until the load instruction is completed.

For a processor having an in-order execution engine, the stalling of an instruction in the processor pipeline may cause the stalling of subsequent instructions in the pipeline. For a processor having an out-of-order execution engine, the stalling of an instruction in the processor pipeline may not affect the processing of subsequent, independent, instructions. For one embodiment of the present invention, execution of a producer instruction may be deemed sufficiently "complete" when the register value will be available to an executing consumer instruction by the time the consumer instruction needs the value.

The add instruction, which was executed two clocks earlier, has left the status bits for register R3 in table 154 of FIG. 1B indicating that register R3 is ready for consumer instructions of class I or M, and pending for consumer instructions of class S. This agrees with the register latencies associated with a producer instruction having an opcode class of I, as defined above.

The subtract instruction, which was executed one clock earlier, has left the status bits for register R5 in table 154 of FIG. 1B indicating that register R5 is ready for consumer instructions of class 1, and pending for consumer instructions of class S or M. Again, this agrees with the register latencies associated with a producer instruction having an opcode class of I, as defined above.

Upon executing the packed add instruction, consumer register R5 is used to lookup the row associated with register R5 in table 154 of FIG. 1B. The status bits in the three columns of table 154 are then provided to the inputs of multiplexer 155. The opcode of the packed add instruction is at least partially decoded by decoder 150 of FIG. 1A to determine the opcode class of the packed add instruction, and this opcode class is provided to the control input of multiplexer 155. The opcode class of the packed add instruction is S, so the status bit in the center column of the table is selected by multiplexer 155. This status bit indicates that register R5 is pending, and a register pending status signal is provided at output 170.

The register pending signal may then be used to generate a hazard signal, stalling the execution of the packed add instruction. Once the register latency period has expired between the subtract instruction of class I and the packed add instruction of class S, the status bit in column S of table 154 for register R5 is updated to indicate a status of ready. According to the register latencies defined above, this occurs three clocks after the subtract instruction completes execution. Once this occurs, the register ready signal is provided as register status signal 170. This register ready signal may then be used to generate a no hazard signal, allowing execution of the packed add instruction to then proceed normally.

The circuit of FIG. 1C is contained within register scoreboard 151 of FIG. 1A in accordance with an alternate embodiment of the present invention. The circuit comprises three register latency timers, one to time the register latency from the producer instruction to the I-unit, one to time the register latency from the producer instruction to the S-unit, and one to time the register latency from the producer instruction to the M-unit. Each register latency timer comprises a series of three clocked stages, each stage having readiness logic 160 and being coupled to inputs of multiplexers 161, 162, and 163. Each of multiplexers 161–163 are controlled by the consumer opcode class. The outputs of each of the multiplexers are coupled to the input of OR gate 171, the output of which is coupled to an input of AND gate 165. The other input to AND gate 165 is coupled to an output of comaprator 164. Comparator 164 compares the consumer register ID to the producer register ID. The output of AND gate 165 is register status signal 170.

For an alternate embodiment of the present invention, the circuit of FIG. 1C may include any number of register latency timers to accommodate any number of consumer opcode classes. In addition, each latency timer may include any number of clock stages to accommodate any length of register latency between producer and consumer instructions. For one embodiment of the present invention, register scoreboard 151 of FIG. 1A includes a plurality of circuits, each substantially similar to the circuit of FIG. 1C. This plurality of circuits is used to accommodate multiple consumer and producer register IDs.

The register latency timers of FIG. 1C are designed to implement the predetermined register latencies discussed above. Before the register latency timers are started, the clock stages are reset to a register status of pending. Referring, again, to the set of instructions presented above, upon executing the add instruction, the opcode class of the add instruction, I, is provided to readiness logic circuits 160 (these connections are not shown to avoid obscuring the figure). Readiness logic 160 includes circuitry that determines, for each type of timer, whether or not a register is ready based on producer class, pipeline stage, and the register status signal from the previous stage.

Initially, all the signals output from multiplexers 161–163 are register pending signals. The producer register ID for R3 is provided to an input of comparator 164. One clock later, the add instruction completes execution, the subtract instruction begins execution, and the output from the first stage of the register latency timer to the integer unit of FIG. 1C becomes a register ready signal. The consumer opcode class of the subtract instruction, I, is provided to the control input of multiplexers 161–163, thereby passing the register ready signal applied to the I input of multiplexer 161 to its output.

This register ready signal is passed through OR gate 171 and is applied to the input of AND gate 165. The other input to AND gate 165 is the result of comparator 164. Because the producer register ID matches the consumer register ID for R3, the output of comparator 164 is a match signal for this register ID. The combination of the match signal at one input of AND gate 165 and the register ready signal at the other input of the AND gate results in a register ready output signal from AND gate 165. This is the final register status signal, 170. In accordance with one embodiment of the present invention, this register ready signal may then be used to generate a no hazard signal, allowing execution of the packed add instruction to then proceed normally.

As an another example of the operation of the circuit of FIG. 1C, consider the case in which the subtract instruction is the producer instruction of register R5, and the packed add instruction is the consumer instruction. The clock stages are reset to a register status of pending. Upon executing the subtract instruction, the opcode class of the subtract instruction, I, is provided to readiness logic circuits 160.

Initially, all the signals output from multiplexers 161–163 are register pending signals. The producer register ID for R5 is provided to an input of comparator 164. One clock later, the subtract instruction completes execution, the packed add instruction begins execution, and the output from the first stage of the register latency timer to the integer unit of FIG. 1C becomes a register ready signal. The consumer opcode class of the packed add instruction, S, is provided to the control inputs of multiplexers 161–163. The signals applied to the S inputs of multiplexers 161–163 are all register pending signals.

These register pending signals are combined by OR gate 171 and applied to the input of AND gate 165. The other input to AND gate 165 is the result of comparator 164. Because the producer register ID matches the consumer register ID for R5, the output of comparator 164 is a match signal. The combination of the match signal at one input of AND gate 165 and the register pending signal at the other input of the AND gate results in a register pending output signal from AND gate 165. This is the final register status signal, 170. In accordance with one embodiment of the present invention, this register pending signal may then be used to generate a hazard signal, possibly stalling the execution of the packed add instruction.

One clock later, after the second clock, the output from the second stage of the register latency timer to the memory unit of FIG. 1C becomes a register ready signal. The signals applied to the S inputs of multiplexers 161–163, selected by the packed add opcode class, remain register pending signals, and the register pending signal continues to be applied to the input of AND gate 165. The other input to AND gate 165 is still a match signal, resulting in a register pending output signal from AND gate 165. This register status signal, 170, may then be used to generate the hazard signal that may continue to stall the execution of the packed add instruction.

One clock later, after the third clock, the output from the third stage of the register latency timer to the SIMD unit of FIG. 1C switches to a register ready signal, and this output is passed through to AND gate 165 via multiplexer 163 and OR gate 171. As a result, a register ready signal is output from AND gate 165. This register status signal, 170, may then be used to generate a no hazard signal, allowing execution of the packed add instruction to then proceed normally.

Finally, consider the case in which the packed add instruction is the producer instruction of register R7, and the store instruction is the consumer instruction. The clock stages are reset to a register status of pending. Upon executing the packed add instruction, the opcode class of the packed add instruction, S, is provided to readiness logic circuits 160 of FIG. 1C.

Initially, all the signals output from multiplexers 161–163 are register pending signals. The producer register ID for R7 is provided to an input of comparator 164. One clock later, the store instruction begins execution, and the output from the first stage of the register latency timer to the integer unit of FIG. 1C becomes a register ready signal. For one embodiment of the present invention, the packed add instruction completes execution after one clock. For an alternate embodiment, the packed add instruction takes multiple clocks to complete execution. The consumer opcode class of the store instruction, M, is provided to the control inputs of multiplexers 161–163, thereby applying register pending signals to the inputs of OR gate 171.

The register pending signals are combined and applied to the input of AND gate 165. The other input to AND gate 165 is the result of comparator 164. Because the producer register ID matches the consumer register ID for R7, the output of comparator 164 is a match signal. The combination of the match signal at one input of AND gate 165 and the register pending signal at the other input of the AND gate results in a register pending output signal from AND gate 165. This is the final register status signal 170. In accordance with one embodiment of the present invention, this register pending signal may then be used to generate a hazard signal, possibly stalling the execution of the store instruction.

One clock later, after the second clock, the output signals from multiplexers 161–163 of FIG. 1C remain register pending signals, resulting in no change in register status signal 170. One clock later, after the third clock, the output from multiplexer 163 switches to a register ready signal. This signal is applied to AND gate 165 via OR gate 171. As a result, a register ready signal is output from AND gate 165. This register status signal 170 may then be used to generate a no hazard signal, allowing execution of the store instruction to then proceed normally.

Figure 2:
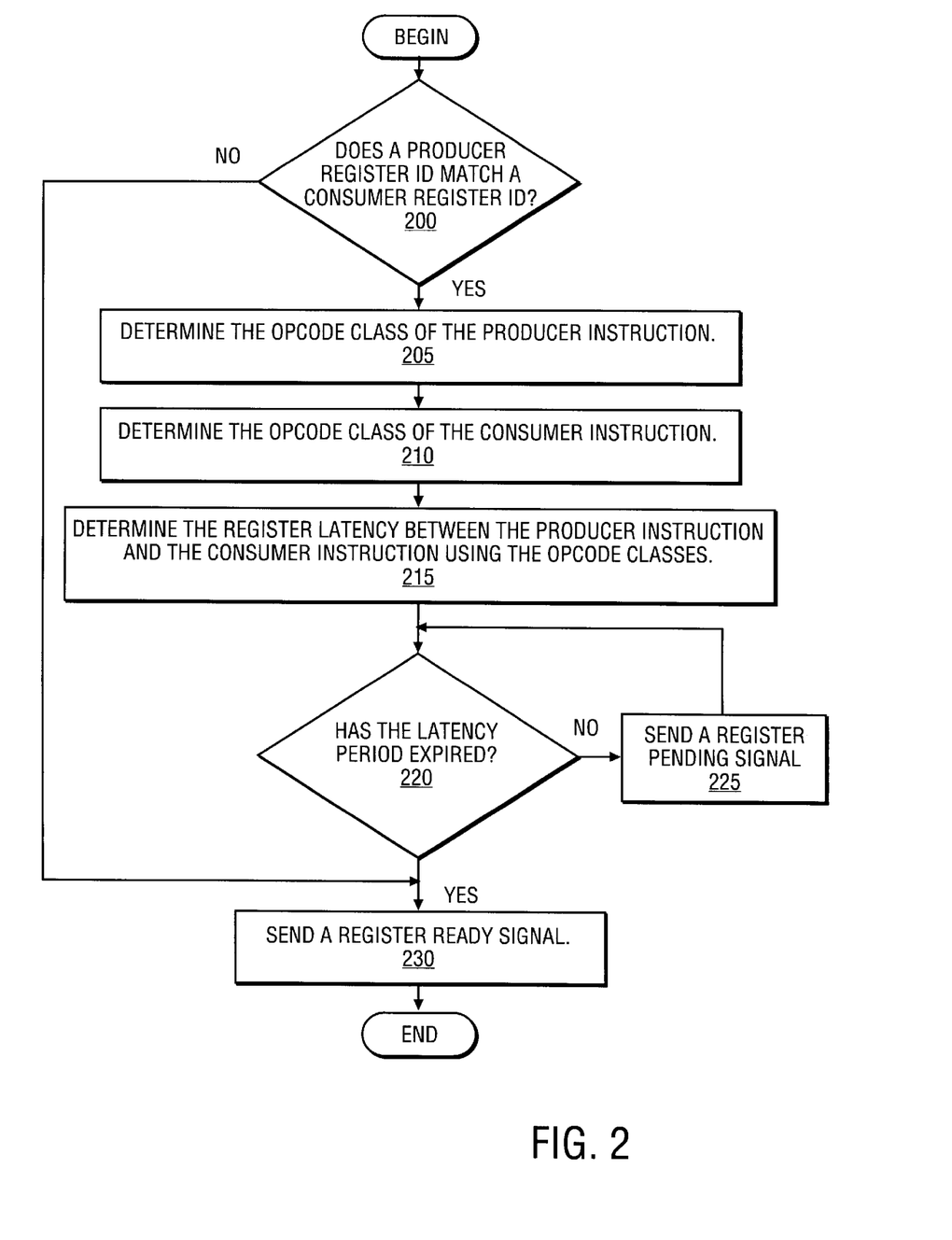
FIG. 2 is a flow chart showing a method of the present invention.

FIG. 2 is a flow chart showing a method of the present invention in accordance with one embodiment. At step 200, it is first determined if a producer register ID matches a consumer register ID. For an embodiment of the present invention in which a status bit is looked up in a table, there is a match if the register ID indexes one or more status bits in the table. For an embodiment of the present invention in which a status bit is dynamically generated by register latency timers for each producer/consumer opcode class pair, a match is determined using a comparator. If there is no match, a register ready signal is sent at step 230. If there is a match, process flow continues at step 205. For an alternate embodiment of the present invention, step 200 may be performed after or in parallel with one or more other steps of the flow chart. For other embodiments of the present invention, the order of other steps of the flow chart may be rearranged, or some steps may be performed in parallel with others, to increase execution speed or improve efficiency.

At step 205 of FIG. 2, the opcode class of the producer instruction is determined, and at step 210 the opcode class of the consumer instruction is determined. For one embodiment of the present invention, the opcode class of an instruction is determined by decoding as least a portion of the opcode of the instruction.

At step 215 of FIG. 2, the register latency between the producer instruction and the consumer instruction is determined using the opcode classes determined in steps 205 and 210. For one embodiment of the present invention, the register latency is determined by starting a plurality of register latency timers upon executing the producer instruction. Each of the plurality of register latency timers is associated with different classes of consumer instructions. The actual consumer instruction class determined in step 210 is then used to select the appropriate register latency timer output.

At step 220 of FIG. 2, it is determined if the register latency period has expired. For one embodiment of the present invention, this is done using the output signal of the register latency timer selected at step 215. If it determined that the latency period has not expired, a register pending signal is sent at step 225, and process flow returns to step 220. Thus, a register pending signal is continually sent until the register latency period has expired. Once it is determined that the register latency has expired, a register ready signal is sent at step 230. For one embodiment of the present invention, the register status signals, including the register pending signal and the register ready signal, are used to generate a hazard/no hazard signal that controls the stalling of the consumer instruction in the processor pipeline.

Figure 3:
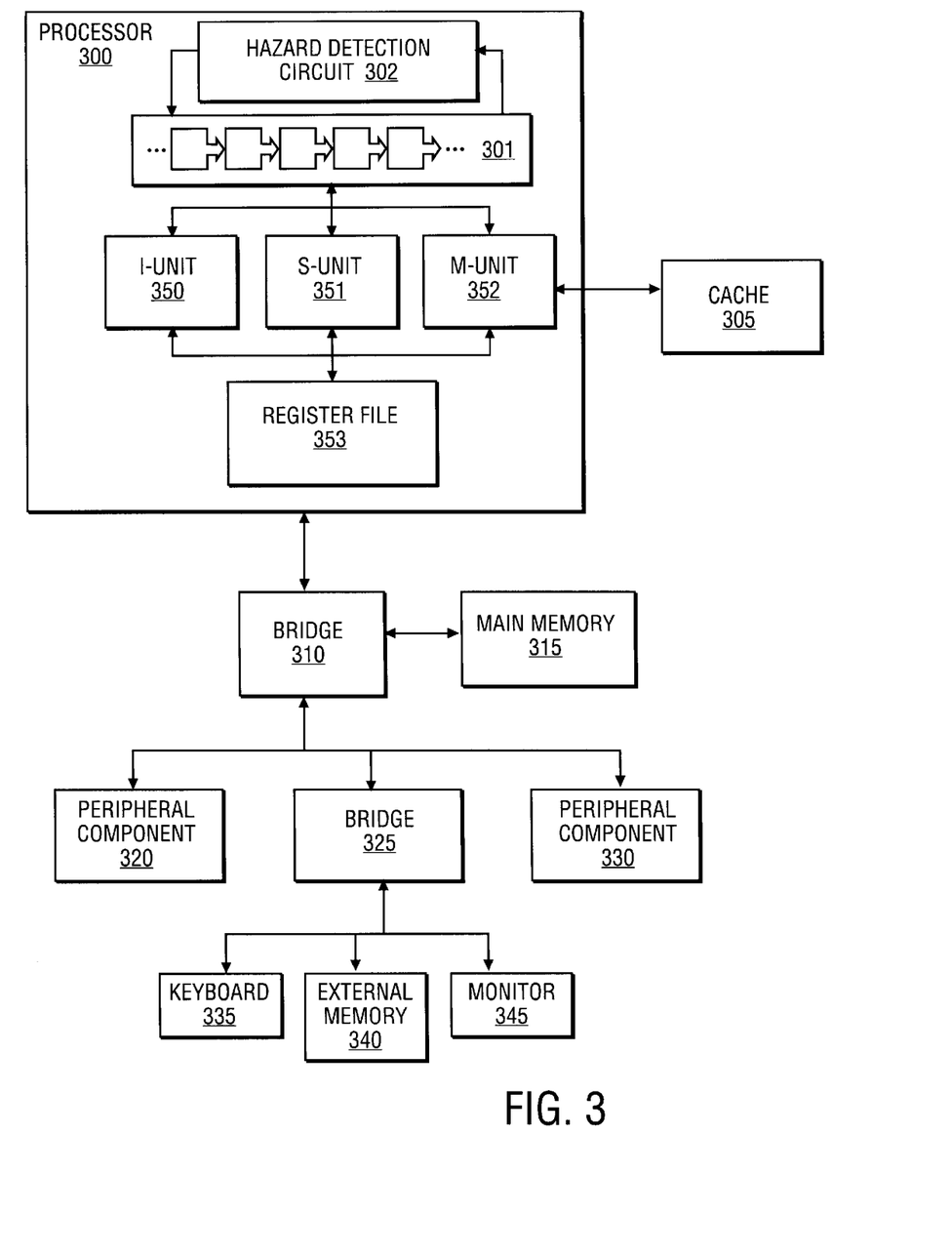
FIG. 3 is a computer system formed in accordance with an embodiment of the present invention.

FIG. 3 is a computer system formed in accordance with an embodiment of the present invention. Processor 300 includes pipeline 301 coupled to hazard detection circuit 302, integer unit 350, SIMD unit 351, and memory unit 352. The I, S, and M-units are coupled to each other and to register file 353. Cache 305 is coupled to M-unit 352. Bridge 310 is used to couple processor 300 to main memory 315 and to peripheral components 320 and 330. Bridge 325 couples keyboard 335, external memory 340, and monitor 345 to bridge 310.

Peripheral components 320 and 330 of FIG. 3 may include audio and video input/output devices such as audio/video generators, accelerators, or analyzers. External memory 340 may include a hard drive, floppy disk, tape drive, other magnetic storage media, a battery powered random access memory (RAM) device, an electrically programmable read only memory (EPROM) storage device, other solid-state storage device, a CD-ROM, or other non-volatile, machine-readable, storage medium.

A sequence of instructions is stored in external memory 340 of FIG. 3, including a producer instruction that produces a register and a consumer instruction that consumes the register. For example, the producer instruction may have a class of I because it is to be executed in I-unit 350 of processor 300, and the consumer instruction may have a class of S because it is to be executed in S-unit 351. When the computer system of FIG. 3 is activated, processor 300 transfers the instructions from external memory 340 into main memory 315 via bridges 325 and 310. The instruction may then be transferred to cache 305 before being executed by processor 300.

Execution of the producer instruction by processor 300 in I-unit 350 causes hazard detection circuit 302 to start register latency timers associated with S-unit 351 and M-unit 352 of FIG. 3. In addition, hazard detection circuit 302 may start register latency timers associated with other units of processor 300. Subsequent execution of the consumer instruction in S-unit 351 causes hazard detection circuit 302 to select the output of the register latency timer associated with the S-unit. The hazard detection circuit uses the output of this timer to determine if the register latency from the producer to the consumer instruction has expired. If the timer has not expired, a register pending signal is used to generate a hazard signal.

This hazard signal is sent form hazard detection circuit 302 of FIG. 3 to processor pipeline 301, and in response, pipeline 301 stalls the execution of the consumer instruction. Once the register latency period set by the register latency timer has expired, the value of the register has been forwarded from I-unit 350 to S-unit 351 and, simultaneously, to register file 353. Once S-unit 351 receives the register value, the register becomes ready to the consumer instruction being executed in the S-unit.

In response to the expiration of the register latency period in hazard detection circuit 302 of FIG. 3, a register ready signal is sent. This register ready signal is used to generate a no hazard signal. The no hazard signal is sent from hazard detection circuit 302 to processor pipeline 301, and in response, pipeline 301 proceeds with the execution of the consumer instruction through S-unit 351.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A method of hazard detection comprising:
   determining a producer opcode class of a producer instruction;
   determining a consumer opcode class of a consumer instruction;
   determining a register latency period between the producer instruction and the consumer instruction based on the producer opcode class and the consumer opcode class; and
   sending a register status signal based on the register latency period.

2. The method of claim 1, further comprising determining if a producer register ID of the producer instruction matches a consumer register ID of the consumer instruction.

3. The method of claim 2, wherein sending the register status signal comprises sending a register pending signal for the register latency period if it is determined that the producer register ID matches the consumer register ID.

4. The method of claim 3, wherein sending the register status signal further comprises sending a register ready signal based on expiration of the register latency period.

5. The method of claim 2, wherein sending the register status signal comprises sending a register ready signal if it is determined that there is no match between the producer register ID and the consumer register ID.

6. The method of claim 2, wherein sending the register status signal comprises sending a register ready signal if the producer opcode class matches the consumer opcode class.

7. The method of claim 1, further comprising sending a hazard signal if the register status signal indicates a register status of pending.

8. The method of claim 1, wherein determining the producer opcode class and determining the consumer opcode class includes decoding at least a portion of the producer instruction and the consumer instruction, respectively.

9. The method of claim 1, wherein determining the producer opcode class and determining the consumer opcode class is performed using execution cluster information associated with the producer instruction and consumer instruction, respectively.

10. The method of claim 1, wherein determining the register latency period includes implementing a register latency timer selected by the consumer opcode class.

11. The method of claim 1, wherein determining the register latency period includes looking up a register status associated with both a consumer register ID and the consumer opcode class of the consumer instruction in a table.

12. The method of claim 1, wherein sending the register status signal includes sending a register pending signal until the register latency period expires, then sending a register ready signal.

13. A method of hazard detection comprising:
   receiving a producer register ID and a producer opcode class associated with a producer instruction;
   starting first and second register latency timers;
   receiving a consumer register ID and a consumer opcode class associated with a consumer instruction;
   selecting the first timer if the consumer opcode class is a first type; and
   selecting the second timer if the consumer opcode class is a second type.

14. The method of claim 13, further comprising determining if the producer register ID matches the consumer register ID.

15. The method of claim 14, further comprising sending a register pending signal before a selected timer expires if the producer register ID matches the consumer register ID, and sending a register ready signal if either the selected timer expires or the producer register ID does not match the consumer register ID.

16. The method of claim 15, further comprising stalling at least a portion of a processor pipeline before the selected timer expires if the producer register ID matches the consumer register ID.

17. The method of claim 13, wherein selecting the first timer includes selecting a register status bit from a row of a table indexed by the consumer register ID and a column of the table associated with the consumer opcode class.

18. The method of claim 13, wherein selecting the second timer includes selecting a series of clocked stages associated with the consumer opcode class.

19. The method of claim 13, wherein output of the first and second timers is dependent on the producer opcode class.

20. A processor comprising:
   an opcode class decoder; and
   a register scoreboard including a first multiplexer having its control input coupled to the opcode class decoder to select a register status signal based on a consumer opcode class provided by the decoder.

21. The processor of claim 20, wherein the register scoreboard further comprises a register status bit table indexed by register IDs and having a plurality of columns, each column having an output coupled to an input of the first multiplexer.

22. The processor of claim 21, wherein the register scoreboard further comprises a plurality of register latency timers, each having an output coupled to the register status bit table to control register status bit values.

23. The processor of claim 20, wherein the register scoreboard further comprises a plurality of register latency timers, each comprising a series of clocked stages and having a register latency timer output, each register latency timer output being coupled to an input of the first multiplexer.

24. A computer system comprising:
   a processor; and
   a memory having stored therein a producer instruction and a consumer instruction that, when executed by the processor, cause the processor to time a register latency between the producer instruction and the consumer instruction based on a producer class and a consumer class.

25. The system of claim 24, wherein the instructions further cause the processor to send a register status signal based on the register latency period, and generate a hazard/no hazard signal using the register status signal.

26. The system of claim 25, wherein the instructions further cause the processor to send a register pending signal if the register latency has not expired and a producer register ID of the producer instruction matches a consumer register ID of the consumer instruction, and to send a register ready signal if the register latency has expired.

27. The system of claim 24, wherein the processor includes a register status table, and the instructions further cause a register status bit indexed by a register ID produced by the producer instruction and consumed by the consumer instruction to switch from a pending signal to a ready signal upon expiration of the register latency.

28. The system of claim 24, wherein the processor includes a plurality of register latency timers, each having an output coupled to an input of a multiplexer, and the instructions further cause the multiplexer to select the register latency timer output associated with the consumer class.

\* \* \* \* \*